United States Patent
Sharma et al.

(10) Patent No.: US 12,024,016 B1
(45) Date of Patent: Jul. 2, 2024

(54) HYBRID PROJECTOR SYSTEM FOR A HEAD UP DISPLAY WITHIN A VEHICLE

(71) Applicant: GM Global Technology Operations LLC, Detroit, MI (US)

(72) Inventors: Manoj Sharma, Troy, MI (US); Thomas Seder, Fraser, MI (US); Joseph F. Szczerba, Grand Blanc, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/345,040

(22) Filed: Jun. 30, 2023

(51) Int. Cl.
| | |
|---|---|
| G09G 5/00 | (2006.01) |
| B60K 35/00 | (2006.01) |
| G03B 21/20 | (2006.01) |
| B60K 35/23 | (2024.01) |
| B60K 35/60 | (2024.01) |

(52) U.S. Cl.
CPC ............ B60K 35/00 (2013.01); G03B 21/208 (2013.01); *B60K 35/23* (2024.01); *B60K 35/60* (2024.01); *B60K 2360/23* (2024.01); *B60K 2360/25* (2024.01); *B60K 2360/332* (2024.01); *B60K 2360/334* (2024.01); *B60K 2360/336* (2024.01); *B60K 2360/347* (2024.01); *B60K 2360/785* (2024.01)

(58) Field of Classification Search
CPC .. G02B 27/01; G02B 27/0101; G03B 21/208; B60K 35/00; B60K 35/236; B60K 2360/23; B60K 2360/25; B60K 2360/332; B60K 2360/334; B60K 2360/336; B60K 2360/347; B60K 2360/785
See application file for complete search history.

(56) References Cited

U.S. PATENT DOCUMENTS

| | | | |
|---|---|---|---|
| 8,427,395 B2 * | 4/2013 | Seder .................... | G01S 13/931 345/7 |
| 8,514,099 B2 * | 8/2013 | Seder .................... | G02B 27/01 340/901 |
| 8,830,141 B2 * | 9/2014 | Seder .................... | G02B 1/105 345/7 |
| 2010/0253918 A1 * | 10/2010 | Seder .................... | G08G 1/167 353/13 |
| 2012/0173069 A1 * | 7/2012 | Tsimhoni ........ | B60W 30/18163 701/25 |
| 2013/0141250 A1 * | 6/2013 | Mathieu ................ | B60K 35/00 340/901 |
| 2017/0212633 A1 * | 7/2017 | You ...................... | G06F 3/0412 |
| 2020/0363634 A1 | 11/2020 | Milanovic et al. | |
| 2021/0360211 A1 | 11/2021 | Kawamura | |
| 2023/0375829 A1 * | 11/2023 | Seder ................ | G02B 27/0101 |
| 2024/0029559 A1 * | 1/2024 | Bond .................... | B60K 35/00 |
| 2024/0045204 A1 * | 2/2024 | Bond .................... | G02B 27/0093 |
| 2024/0094530 A1 * | 3/2024 | Bond .................... | G06T 19/006 |

FOREIGN PATENT DOCUMENTS

| | | | |
|---|---|---|---|
| JP | 2011111123 A | * | 6/2011 |
| WO | 2014188645 A | | 11/2014 |

\* cited by examiner

*Primary Examiner* — Joe H Cheng
(74) *Attorney, Agent, or Firm* — Vivacqua Crane, PLLC

(57) ABSTRACT

A hybrid projector system for a head up display within a vehicle includes a digital light projector adapted to project a first graphical image onto an inner surface of a windshield of the vehicle, and a vector graphics projector adapted to project a second graphical image onto the inner surface of the windshield of the vehicle.

20 Claims, 7 Drawing Sheets

HYBRID PROJECTOR SYSTEM FOR A HEAD UP DISPLAY WITHIN A VEHICLE

The present disclosure relates to systems and methods for displaying graphics in a vehicle, and more particularly, to graphics projectors for use in a vehicle.

To increase occupant awareness and convenience, vehicles may be equipped with display systems which are configured to provide information about an environment surrounding the vehicle to an occupant. Display systems may use human-interface devices, such as, for example, touchscreens, to provide information to the occupant. Display systems may also use head-up displays (HUD) to provide information to the occupant. To control and/or illuminate the HUD, a graphics projector may be used to project graphics upon a surface (e.g., a windscreen) of the vehicle. However, current graphics projectors may utilize high-intensity, concentrated light sources, such as, for example, lasers. High-intensity, concentrated light sources may cause the occupant discomfort when reflecting off of surfaces of the vehicle. Additionally, high-intensity, concentrated light sources may increase weight and resource use of the vehicle.

Thus, while current graphics projectors achieve their intended purpose, there is a need for a new and improved system for graphics projection for a vehicle.

SUMMARY

According to several aspects of the present disclosure, a hybrid projector system for a head up display within a vehicle includes a digital light projector adapted to project a first graphical image onto an inner surface of a windshield of the vehicle, and a vector graphics projector adapted to project a second graphical image onto the inner surface of the windshield of the vehicle within the first graphical image, the second graphical image having greater brightness than the first graphical image and adapted to highlight a feature within the first graphical image.

According to another aspect, the digital light projector includes a light source adapted to project an excitation light, a condensing lens adapted to focus the excitation light from the light source, a color filter adapted to split the focused excitation light into red, green and blue light, a shaping lens adapted to focus the excitation light passing through the color filter, a digital micro-mirror device (DMD) adapted to re-direct the excitation light, and a projection lens adapted to receive the excitation light from the digital micro-mirror device and project the excitation light to the inner surface of the windshield.

According to another aspect, the vector graphics projector includes a light source module including a light-emitting diode (LED) array configured to produce a source light, an optical filter in optical communication with the LED array, wherein the optical filter is configured to receive the source light and transmit a filtered light, and a focusing lens in optical communication with the optical filter, wherein the focusing lens is configured to receive the filtered light and transmit a narrow-beam light, an optical collimator in optical communication with the light source module, wherein the optical collimator is configured to receive the narrow-beam light and transmit a collimated light, and an optoelectrical mirror in optical communication with the optical collimator, wherein the optoelectrical mirror is configured to direct the collimated light to form a graphic.

According to another aspect, the optical filter is an optical bandpass filter configured to filter the source light and transmit the filtered light, wherein the filtered light includes only light having a wavelength within a passband of the optical bandpass filter.

According to another aspect, the system further includes a plurality of light source modules in optical communication with the optical collimator.

According to another aspect, the system further includes an optical waveguide in optical communication with the plurality of light source modules and the optical collimator, wherein the optical waveguide is configured to transmit the narrow-beam light from each of the plurality of light source modules to the optical collimator.

According to another aspect, the optical waveguide is a fiber-optic cable in optical communication with the focusing lens of each of the plurality of light source modules using a fiber-optic coupler.

According to another aspect, the system further includes a plurality of dichroic mirrors, wherein each of the plurality of dichroic mirrors is in optical communication with one of the plurality of light source modules, and wherein each of the plurality of dichroic mirrors is configured to transmit the narrow-beam light from one of the plurality of light source modules to the optical collimator.

According to another aspect, each of the plurality of dichroic mirrors is configured to reflect a predetermined wavelength of the narrow-beam light and transmit all other wavelengths of the narrow-beam light.

According to another aspect, a first one of the plurality of light source modules is configured to produce narrow-beam light having a wavelength of 380 nanometers, wherein a second one of the plurality of light source modules is configured to produce narrow-beam light having a wavelength of 405 nanometers, and wherein a third one of the plurality of light source modules is configured to produce narrow-beam light having a wavelength of 460 nanometers.

According to another aspect, the optoelectrical mirror is a digital micromirror device (DMD).

According to another aspect, the optoelectrical mirror is at least one of: a microelectromechanical scanning mirror and a galvanometer mirror.

According to several aspects of the present disclosure, a method of displaying graphics with a hybrid projector system for a head up display within a vehicle includes projecting, with a digital light projector, a first graphical image onto an inner surface of a windshield of the vehicle, and projecting, with a vector graphics projector, a second graphical image onto the inner surface of the windshield of the vehicle within the first graphical image, the second graphical image having greater brightness than the first graphical image and adapted to highlight a feature within the first graphical image.

According to another aspect, the projecting, with a digital light projector, a first graphical image onto an inner surface of a windshield of the vehicle further includes projecting, with a light source, an excitation light, focusing, with a condensing lens, the excitation light from the light source, splitting, with a color filter, the focused excitation light into red, green and blue light, focusing, with a shaping lens, the excitation light passing through the color filter, re-directing, with a digital micro-mirror device (DMD), the excitation light, and receiving, with a projection lens, the excitation light from the digital micro-mirror device and projecting, with the projection lens, the excitation light to the inner surface of the windshield.

According to another aspect, the projecting, with a vector graphics projector, a second graphical image onto the inner surface of the windshield of the vehicle further includes producing, with a light-emitting diode (LED) array of a light source module, a source light, receiving, with an optical bandpass filter of the light source module in optical communication with the LED array, the source light, and filtering, with the optical bandpass filter, the source light, and transmitting, through the optical bandpass filter, filtered light having a wavelength within a passband of the optical bandpass filter, receiving, with a focusing lens of the light source module in optical communication with the optical filter, the filtered light, and transmitting, with the focusing lens, a narrow-beam light, receiving, with an optical collimator in optical communication with the light source module, the narrow-beam light, and transmitting, with the optical collimator, a collimated light, and directing, with an optoelectrical mirror in optical communication with the optical collimator, the collimated light to form a graphic.

According to another aspect, the projecting, with a vector graphics projector, a second graphical image onto the inner surface of the windshield of the vehicle further includes projecting, with a plurality of light source modules in optical communication with the optical collimator of the vector graphics projector, a second graphical image onto the inner surface of the windshield of the vehicle.

According to another aspect, the transmitting, with the focusing lens, a narrow-beam light further incudes transmitting, with a fiber-optic cable waveguide in optical communication with the plurality of light source modules and the optical collimator, the narrow-beam light from each of the plurality of light source modules to the optical collimator.

According to another aspect, the transmitting, with the focusing lens, a narrow-beam light further incudes transmitting, with a plurality of dichroic mirrors, wherein each of the plurality of dichroic mirrors is in optical communication with one of the plurality of light source modules, the narrow-beam light from each of the plurality of light source modules to the optical collimator, wherein each of the plurality of dichroic mirrors is configured to reflect a predetermined wavelength of the narrow-beam light and transmit all other wavelengths of the narrow-beam light.

According to another aspect, the transmitting, with the focusing lens, a narrow-beam light further includes transmitting, with the focusing lens of a first one of the plurality of light source modules, a narrow-beam light having a wavelength of 380 nanometers, transmitting, with the focusing lens of a second one of the plurality of light source modules, a narrow-beam light having a wavelength of 405 nanometers, and transmitting, with the focusing lens of a third one of the plurality of light source modules, a narrow-beam light having a wavelength of 460 nanometers.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
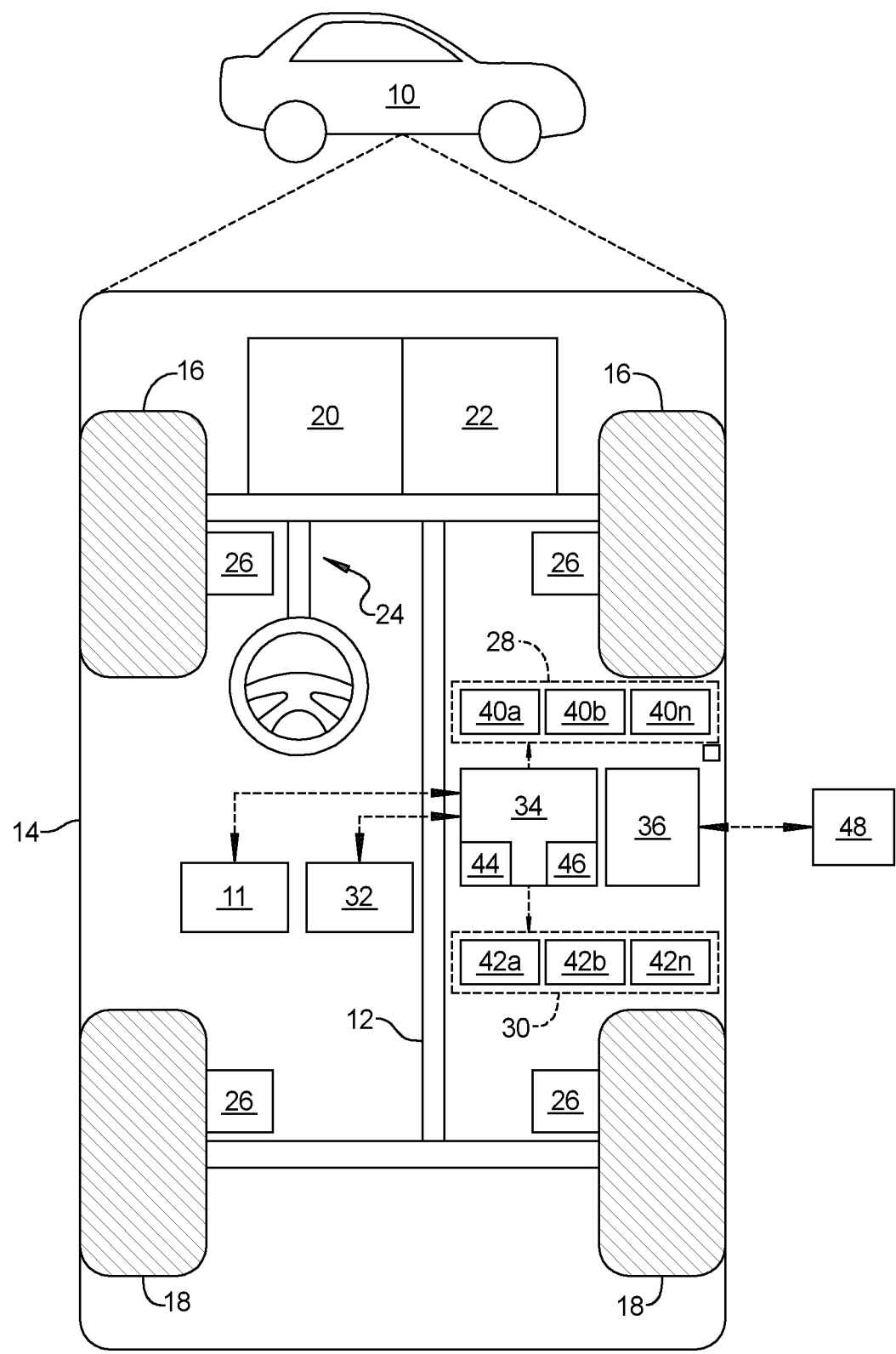
FIG. 1 is a schematic diagram of a vehicle having a system in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated hybrid projector system 11 for a head up display within the vehicle 10 in accordance with various embodiments. In general, the hybrid projector system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, a vehicle controller 34, and a communication system 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10. In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield 56 of the vehicle 10. In another example, at least one of the plurality of sensing devices 40a-40n is affixed outside of the vehicle 10, for example, on a roof of the vehicle 10, having a view of the environment surrounding the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
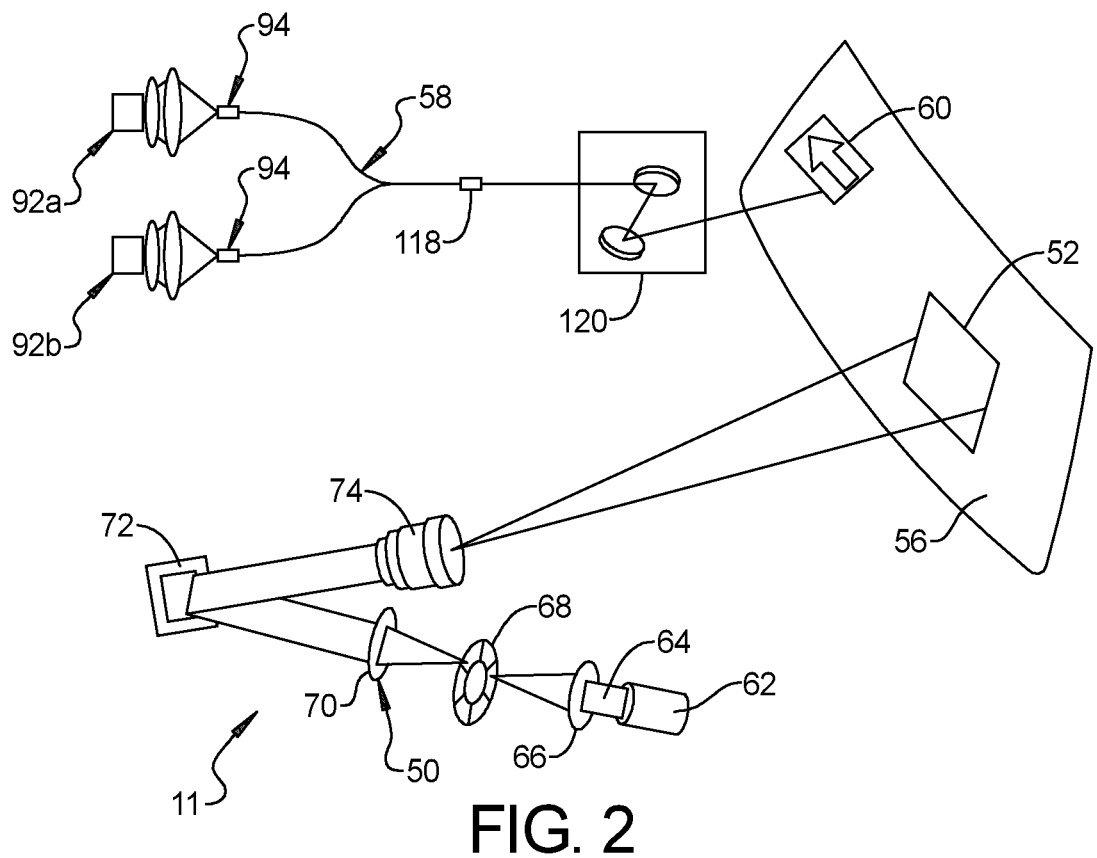
FIG. 2 is a schematic diagram of a system according to an exemplary embodiment, wherein a second graphical image from a vector graphic projector is displayed adjacent a first graphical image from a digital light projector.

Referring to FIG. 2, the hybrid projector system 11 includes a digital light projector (DLP) 50 adapted to project a first graphical image 52 onto an inner surface 54 of a windshield 56 of the vehicle 10, and a vector graphics projector (VGP) 58 adapted to project a second graphical image 60 onto the inner surface 54 of the windshield 56 of the vehicle 10.

The DLP 50 projects a first graphical image 52 that contains various information/infotainment applications. The DLP 50 is capable of projecting two-dimensional and three-dimensional images that depict objects such as pedestrians, buildings and other vehicles in the environment surrounding the vehicle 10. In an exemplary embodiment, the DLP 50 includes a light source 62 adapted to project an excitation light 64, a condensing lens 66 adapted to focus the excitation light 64 from the light source 62, a color filter 68 (color wheel) adapted to split the focused excitation light 64 into red, green and blue light, a shaping lens 70 adapted to focus the excitation light 64 passing through the color filter 68, a digital micro-mirror device (DMD) 72 adapted to re-direct the excitation light 64, and a projection lens 74 adapted to receive the excitation light 64 from the digital micro-mirror device (DMD) 72 and project the excitation light 64 to the inner surface 54 of the windshield 56.

Figure 3:
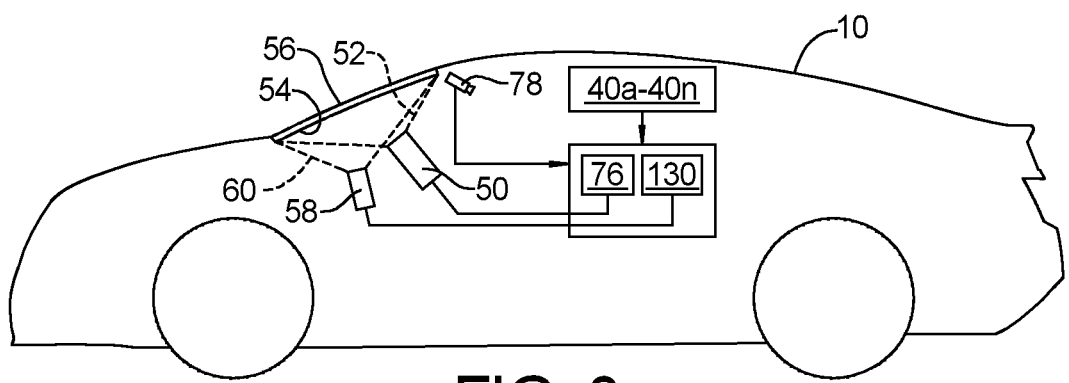
FIG. 3 is a schematic side view of the vehicle shown in FIG. 1.

Referring to FIG. 3, the vehicle controller 34 includes a DLP engine 76. The DLP engine 76 includes a programmable processor including programming to monitor various inputs and determine what information is appropriate to display. The DLP engine 76 can communication directly with various systems and components, or the DLP engine 76 can alternatively or additionally communicate over a LAN/CAN system. The DLP engine 76 utilizes information regarding the operational environment of the vehicle 10 derived from a number of inputs. Various sensing devices 40a-40n collect and provide information. The sensing devices 40a-40n include a camera or image capturing device taking periodic or sequential images representing a view from the vehicle 10. The windshield 56 is equipped with features capable of displaying an image projected thereupon while remaining transparent or substantially transparent such that occupants of the vehicle 10 can clearly observe outside of the vehicle 10 through the windshield 56. It should be understood that, as depicted, the windshield 56 is in the front of the vehicle 10, other surfaces within the vehicle 10 could be used for projection, including side windows and a rear window. Additionally, the view on the front windshield 56 could be continued upon the front vehicle "A-pillars" and onto the side windows as a continuous image.

The DLP engine 76 includes display software or programming translating requests to display information from the DLP engine 76 in graphical representations describing the information. The DLP engine 76 includes programming to compensate for the curved and tilted surface of the windshield 56 and any other surfaces onto which the first graphical image 52 is to be projected. The DLP engine 76 controls the light source 62 which includes a laser or projector device producing an excitation light 64 to project the first graphical image 52.

An occupant monitoring system 78 includes sensors known in the art to approximate a location of the head of an occupant and further the orientation or gaze location of the eyes of the occupant. Based upon the output of the occupant monitoring system 78 and input data tracking location information regarding the environment around the vehicle 10, the DLP engine 76 can accurately position the first graphical image 52 such that the occupant sees the first graphical image 52 overlaid with visual images through the windshield 56.

The system 11 described above includes eye sensing and head sensing devices allowing estimation of eye location, allowing registration of images upon the windshield 56 such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle 10 can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate registration of graphics upon the windshield 56 are contemplated, and the disclosure is not intended to be limited to the particular embodiments described herein.

Figure 4:
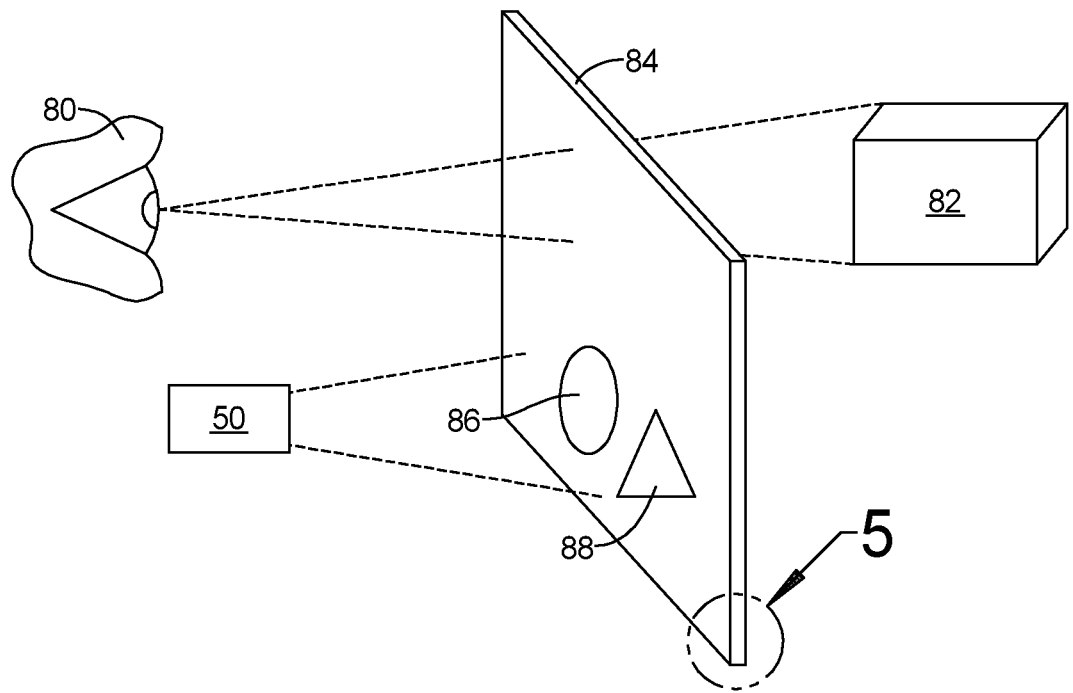
FIG. 4 is schematic illustration of a substrate for the windshield of the vehicle according to an exemplary embodiment.
Figure 5:
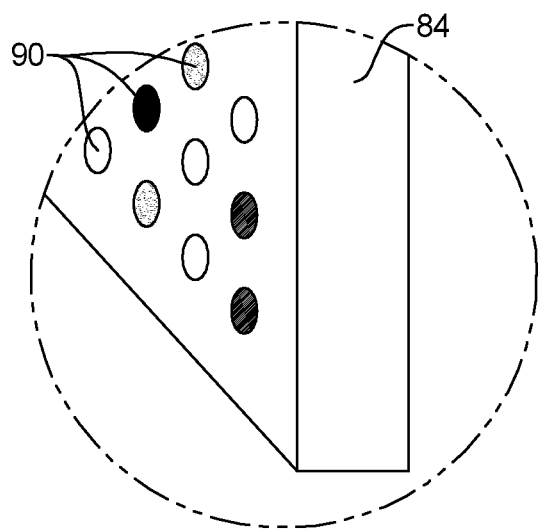
FIG. 5 is a enlarged portion of FIG. 4, as indicated by the circle labelled "FIG. 5" in FIG. 4.

The windshield 56 functions as a medium through which relevant features are observable while serving as a display device upon which the first graphical image 52 may be displayed. The windshield 56 is both transparent and capable of displaying images projected by an excitation light 64. Referring to FIG. 4 and FIG. 5, an occupant 80 is able to see an arbitrary object (e.g. cube 82) through a substrate 84 positioned on the windshield 56. The substrate 84 may be transparent or substantially transparent. While the occupant 80 sees the arbitrary object 82 through the substrate 84, the occupant 80 can also see images (e.g. circle 86 and triangle 88) that are created at the substrate 84. The substrate 84 may be part of the windshield 56, a glass substrate, a plastic substrate, a polymer substrate, or other transparent (or substantially transparent) medium that would be appreciated by one of ordinary skill in the art. Other substrates may complement the substrate 84 to provide for tinting, substrate protection, light filtering (e.g. filtering external ultraviolet light), and other functions.

FIG. 5 depicts illumination of transparent displays illuminated with excitation light 64 (e.g. ultraviolet light or infrared light) from a light source 62. The substrate 84 receives excitation light 64 from the light source 62. The received excitation light 64 may be absorbed by light emitting material 90 at the substrate 84. When the light emitting material receives the excitation light 64, the light emitting material 90 emits visible light. Accordingly, images (e.g. circle 86 and triangle 88) may be created at the substrate 84 by selectively illuminating the substrate 84 with excitation light 64.

In an exemplary embodiment, the light emitting material 90 includes transparent phosphors that are embedded into the substrate 84. The transparent phosphors are light emitting particles which fluoresce in response to being excited by the excitation light 64. In an exemplary embodiment, the transparent phosphors are red, green, and blue (RGB) phosphors, allowing full color. The use of monochrome and/or two-color phosphors is also within the scope of the present disclosure. When excitation light 64 is absorbed by the transparent phosphors, visible light is emitted by the transparent phosphors. The excitation light 64 is provided by the light source 62. Use of the substrate 84 and light emitting material 90 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

The excitation light 64 may be ultraviolet light, in accordance with embodiments of the present disclosure. If the excitation light 64 is ultraviolet light, then when the light emitting material 90 emits visible light in response to the ultraviolet light, a down-conversion physical phenomenon occurs. Specifically, ultraviolet light has a shorter wavelength and higher energy than visible light. Accordingly, when the light emitting material 90 absorbs the ultraviolet light and emits lower energy visible light, the ultraviolet light is down-converted to visible light because the ultraviolet light's energy level goes down when it is converted into visible light.

It should be understood, the excitation wavelengths described herein are used particularly for a given sheet of phosphors. Other technology could also be used, such as a holographic grating (Bragg gratings) based technology which uses visible light projectors, wherein RGB LEDs are used to make a vector graphics projector and an RGB-DLP projector.

As shown in FIG. 2 and FIG. 3, the excitation light 64 is output by the light source 62 of the DLP 50. In an exemplary embodiment, the light source 62 is a micro-mirror array (MMA) projector (e.g. a digital light processing (DLP) projector 50). In the DLP 50, the first graphical image 52 is created by microscopically small mirrors laid out in a matrix on a semiconductor chip within the DMD 72. An MMA projector that outputs ultraviolet light may be similar to a MMA projector that outputs visible light, except that the color filter 68 has light filters that are tailored to the ultraviolet light spectrum. In other embodiments, the DLP 50 is a liquid crystal display (LCD) projector. In embodiments, the DLP 50 may be a liquid crystal on silicon (LCOS) projector. In embodiments, the DLP 50 may be an analog projector (e.g. a slide film projector or a movie film projector). One of ordinary skill in the art would appreciate other types of projectors which may be used to project ultraviolet light on the substrate 84.

Figure 6:
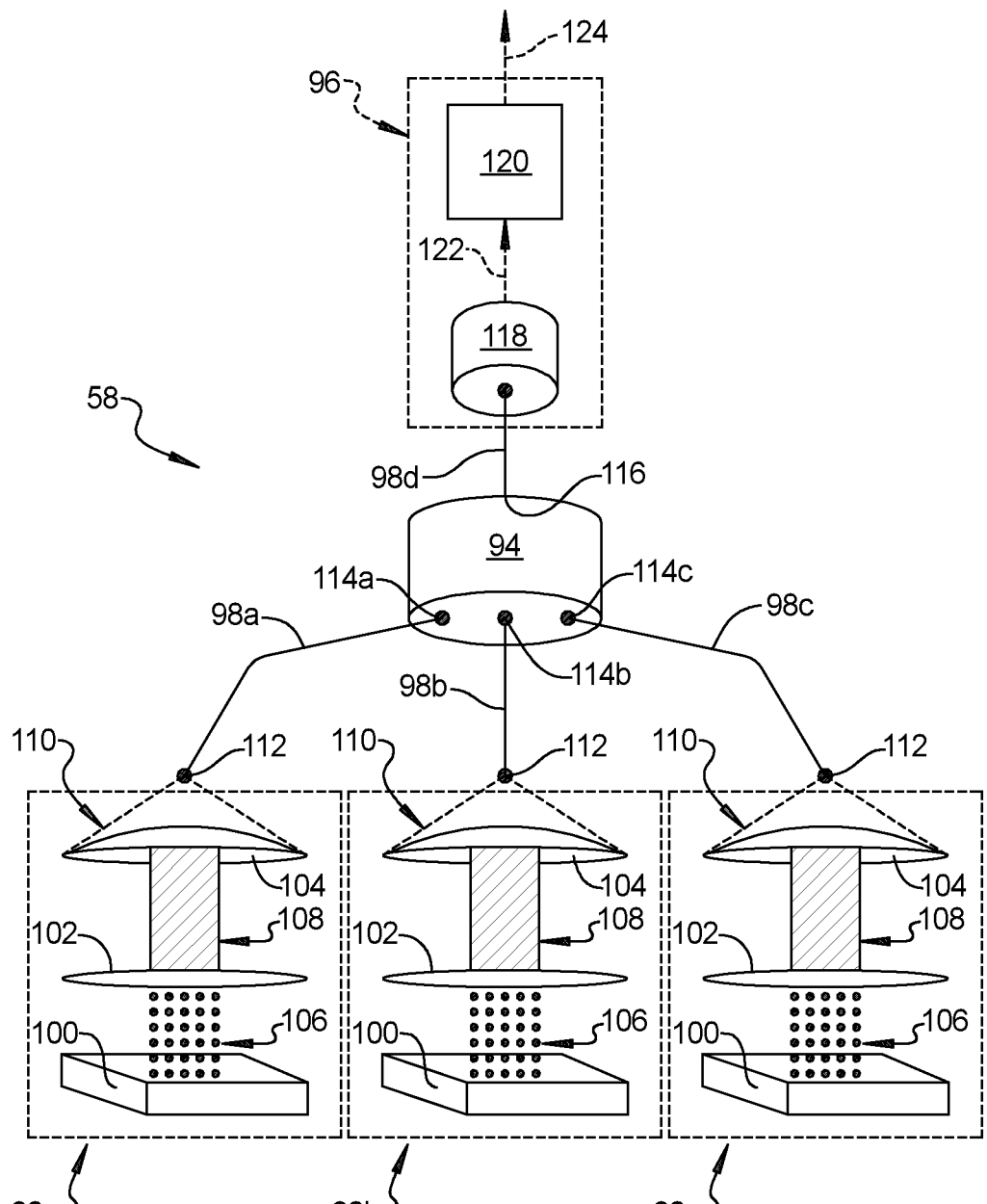
FIG. 6 is a schematic diagram of a vector graphic projector including a waveguide comprising fiber optic cables.

Referring to FIG. 6, a schematic diagram of an exemplary embodiment of the VGP 58 is shown. The VGP 58 generally includes a first light source module 92a, a second light source module 92b, a third light source module 92c, a fiber-optic coupler 94, and an output module 96.

The components of the VGP 58 (i.e., the first light source module 92a, a second light source module 92b, a third light source module 92c, a fiber-optic coupler 94, and an output module 96) are in optical communication with each other. In the scope of the present disclosure, optical communication means that light can propagate through the space between the components and interact with the optical properties of each component. Optical communication may be facilitated by positioning the first light source module 92a, a second light source module 92b, a third light source module 92c, a fiber-optic coupler 94, and an output module 96 such that light is transmitted between the components due to the intrinsic reflection and/or refraction characteristics of the components and/or characteristics of a medium between the components (e.g., air). Optical communication may also be facilitated by use of an optical waveguide. In the scope of the present disclosure, an optical waveguide is a physical structure that is designed to confine and guide light along a specified path (i.e., between the first light source module 92a, a second light source module 92b, a third light source module 92c, a fiber-optic coupler 94, and an output module 96). In a non-limiting example, a plurality of fiber-optic cables 98a, 98b, 98c, 98d are used to establish optical communication. In an exemplary embodiment, the fiber-optic cables 98a, 98b, 98c, 98d are optoelectrical cables which transmit light, acting as optical waveguides. In a non-limiting example, the fiber-optic cables 98a, 98b, 98c, 98d contain multiple strands of glass or plastic fibers. The fibers are bundled together and surrounded by a protective coating. The first fiber-optic cable 98a is used to establish optical communication between the first light source mode 92a and the fiber-optic coupler 94. The second fiber-optic cable 98b is used to establish optical communication between the second light source module 92b and the fiber-optic coupler 94. The third fiber-optic cable 98c is used to establish optical communication between the third light source module 92c and the fiber-optic coupler 94. The fourth fiber-optic cable 98d is used to establish optical communication between the fiber-optic coupler 94 and the output module 96. It should further be understood that various additional methods for establishing optical communication between optical components, including, for example, planar waveguides, rib waveguides, channel waveguides, hollow core waveguides, and the like are within the scope of the present disclosure.

The first light source module 92a includes a light-emitting diode (LED) array 100, an optical filter 102, and a focusing lens 104. The LED array 100 is used to provide a light source for the first light source module 92a. In an exemplary embodiment, the LED array 100 includes a plurality of light-emitting diodes (LEDs) electrically connected in a series or parallel configuration (not shown). The LED array 100 further includes at least two electrical terminals (not shown) electrically connected to the plurality of LEDs. The plurality of LEDs are arranged such as to achieve a high density of LEDs in a relatively small area. In a non-limiting example, the plurality of LEDs are arranged in a grid pattern. In another non-limiting example, the plurality of LEDs are arranged in a radial pattern. The plurality of LEDs are mechanically affixed to a substrate to provide structural stability to the arrangement of the plurality of LEDs. In a non-limiting example, the substrate is a printed circuit board (PCB). In another non-limiting example, the substrate is a metal-core printed circuit board (MCPCB) including a metal layer which contributes to thermal management of the plurality of LEDs by dissipating heat.

When an electrical current is passed through the plurality of LEDs using the electrical terminals, the plurality of LEDs emit light. The light emitted by the plurality of LEDs of the LED array 100 is referred to as a source light 106. In an exemplary embodiment, the source light 106 is polychromatic, meaning that the source light 106 contains multiple wavelengths of light (e.g., light having wavelengths between 380 nanometers and 460 nanometers). In another exemplary embodiment, the source light 106 is monochromatic, meaning that the source light 106 contains only a single wavelength of light (e.g., 380 nanometers, 405 nanometers, or 460 nanometers). It should be understood that the aforementioned wavelengths and wavelength ranges are merely exemplary in nature. The LED array 100 is configured such that the source light 106 is incident upon the optical filter 102.

The optical filter 102 is used to filter the source light 106. In an exemplary embodiment, the optical filter 102 is configured to receive the source light 106 and transmit a filtered light 108. In the scope of the present disclosure, the filtered light 108 is light having only wavelengths within a passband of the optical filter 102. In a non-limiting example, the optical filter 102 includes a substrate material (e.g., glass or quartz), onto which one or more layers of thin film are deposited. The thin film layers are designed to either absorb or refract specific wavelengths of light. In a first exemplary embodiment, the optical filter 102 is an interference optical bandpass filter. In a non-limiting example, the interference optical bandpass filter includes alternating dielectric layers of materials with different refractive indices. The alternating layers are configured to create an interference pattern that enhances the transmission of wavelengths within the passband and suppresses other wavelengths (analogous to a Fabry-Pérot interferometer).

In another exemplary embodiment, the optical filter 102 is an absorptive optical bandpass filter. In a non-limiting example, the absorptive optical bandpass filter includes one or more layers of an absorbing dielectric material deposited on the substrate. The absorbing layers dissipate the unwanted wavelengths through absorption, while the wavelengths within the passband are transmitted. In another exemplary embodiment, the passband of the optical filter 102 includes only monochromatic light having a single wavelength (e.g., 380 nanometers, 405 nanometers, 460 nanometers). Therefore, the filtered light 108 contains only light having a single wavelength. It should be understood that the aforementioned wavelengths are merely exemplary in nature, and that the passband of the optical filter 102 may include other wavelengths without departing from the scope of the present disclosure. The optical filter 102 is configured such that the filtered light 108 is incident upon the focusing lens 104.

The focusing lens 104 is used to concentrate the filtered light 108 to produce a narrow-beam light 110. In an exemplary embodiment, the focusing lens 104 includes a curved transparent substrate (e.g., glass or other transparent material). When the filtered light 108 passes through the focusing lens 104, the curvature of the focusing lens 104 causes the filtered light 108 to refract towards a focal point 112. The position of the focal point 112 is determined by the curvature and refractive index of the focusing lens 104. The focal point 112 of the focusing lens 104 is a termination of the first fiber-optic cable 98a, such that the narrow-beam light 110 is transmitted from the focusing lens 104 to the fiber-optic coupler 94 via the first fiber-optic cable 98a.

Figure 7:
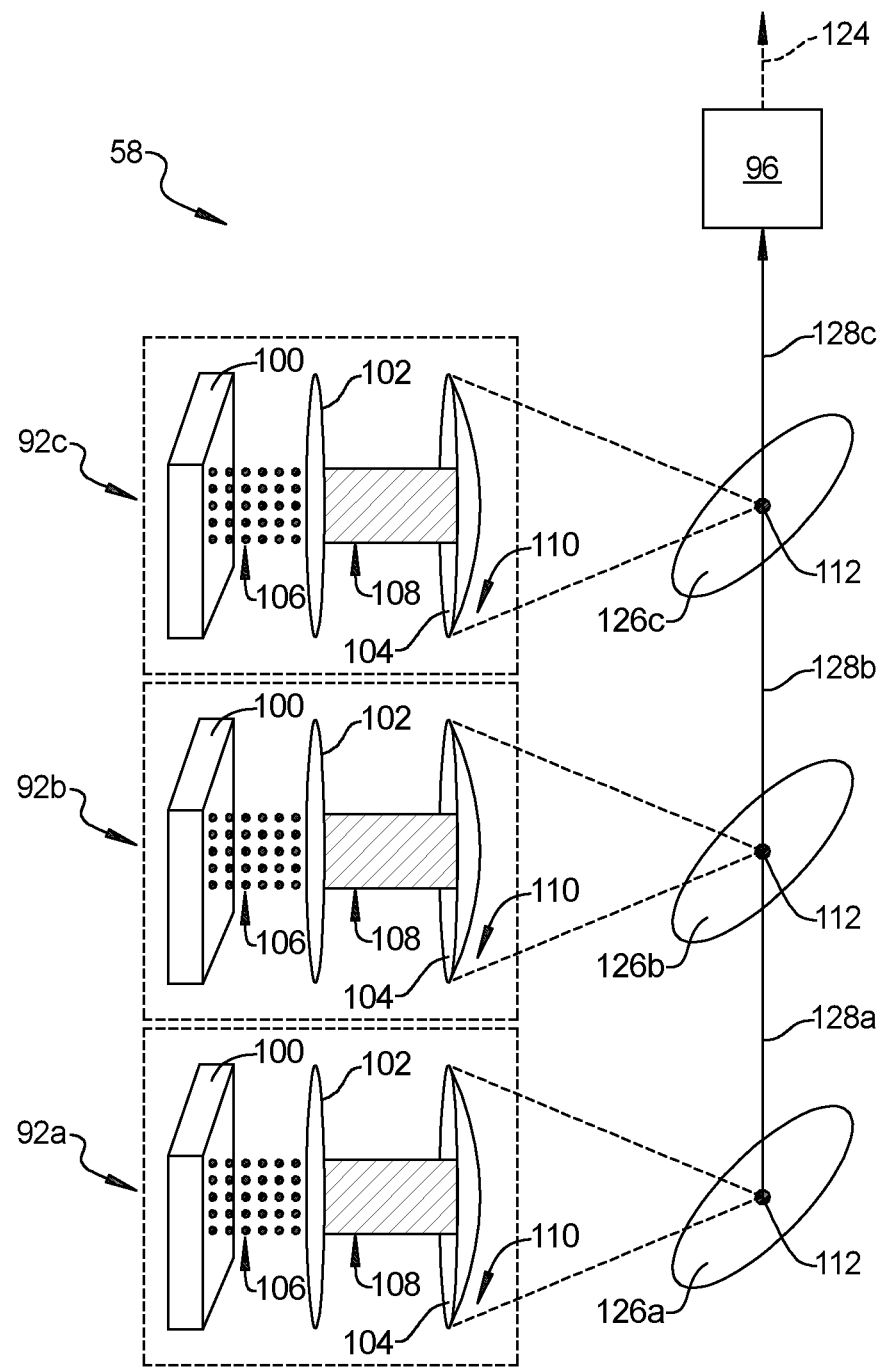
FIG. 7 is a schematic diagram of a vector graphic projector including dichroic mirrors.

It should be understood that the second light source module 92b and the third light source module 92c each include the same components as the first light source module 92a (i.e., the LED array 100, the optical filter 102, and the focusing lens 104). Therefore, the description provided above for the first light source module 92a also applies to the second light source module 92b and the third light source module 92c. It should be understood by those skilled in the art that the VGP 58 can include any suitable number of light source modules. While FIG. 2 illustrates a first light source module 92a and a second light source module 92b, and FIG. 6 and FIG. 7 illustrate a first light source module 92a, a second light source module 92b, and a third light source module 92c, other numbers of light source modules may be used without departing from the scope of the present invention.

In an exemplary embodiment, each of the first light source module 92a, the second light source module 92b, and the third light source module 92c is configured to produce narrow-beam light 110 having a different wavelength. In a non-limiting example, the first light source module 92a produces narrow-beam light 110 having a wavelength of 380 nanometers. The second light source module 92b produces narrow-beam light 110 having a wavelength of 405 nanometers. The third light source module 92c produces narrow-beam light 110 having a wavelength of 460 nanometers. It should be understood that the first light source module 92a, the second light source module 92b, and the third light source module 92c may be configured to produce narrow-beam light 110 having different wavelengths without departing from the scope of the present disclosure.

The fiber-optic coupler 94 is used to combine the narrow-beam light 110 from each of the first light source module 92a, the second light source module 92b, and the third light source module 92c. In an exemplary embodiment, the fiber-optic coupler 94 includes a first input port 114a in optical communication with the first light source module 92a via the first fiber-optic cable 98a, a second input port 114b in optical communication with the second light source module 92b via the second fiber-optic cable 98b, and a third input port 114c in optical communication with the third light source module 92c via the third fiber-optic cable 98c. The fiber-optic coupler 94 further includes an output port 116. Each of the input ports 114a, 114b, 114c and output port 116 includes an optical fiber (not shown) which is aligned and fused with the optical fibers of the other ports. When light is introduced into one of the input ports 114a, 114b, 114c, the light propagates along the optical fiber and is transferred to the output port 116. Therefore, the intensity of the narrow-beam light 110 from each of the first light source module 92a, the second light source module 92b, and the third light source module 92c is summed at the output port 116 of the fiber-optic coupler 94. The output port 116 is in optical communication with the output module 96 via the fourth fiber-optic cable 98d.

The output module 96 is used to direct the narrow-beam light 110 from the output port 116 of the fiber-optic coupler 94 in order to project the second graphical image 60. The output module 96 includes an optical collimator 118 and an optoelectrical mirror 120.

The optical collimator 118 is used to produce a collimated light 122 from the narrow-beam light 110. In an exemplary embodiment, the optical collimator 118 includes a collimating lens, which is used to focus the narrow-beam light 110 into a parallel (i.e., collimated) beam. In a non-limiting example, the collimating lens is a plano-convex or double-convex lens which is configured to produce a desired beam divergence and collimation distance. The optical collimator 118 works by refracting the narrow-beam light 110 from the fiber-optic coupler 94 using the collimating lens to produce the collimated light 122. The optical collimator 118 is in optical communication with the optoelectrical mirror 120.

The optoelectrical mirror 120 is used to direct the collimated light 122 based on electrical signals. In the scope of the present disclosure, the optoelectrical mirror 120 is an electromechanical device (e.g., a microelectromechanical system) configured to direct light with high precision, accuracy, and speed in response to electrical signals. In an exemplary embodiment, the optoelectrical mirror 120 includes a digital micromirror device (DMD). The DMD is an optical microelectromechanical system that contains an array of mirrors which can be individually tilted to reflect light in a desired direction. In a non-limiting example, the DMD is used to create high-resolution images by reflecting the collimated light 122 onto a projection surface. The tilting mirrors on the DMD are controlled by an electronic driver, which rapidly modulates the mirrors to project the second graphical image 60 onto the windshield 56.

In another exemplary embodiment, the optoelectrical mirror 120 is a microelectromechanical scanning mirror. In an exemplary embodiment, the microelectromechanical scanning mirror is an optoelectrical device which utilizes at least one mirror to create high-resolution images. The at least one mirror may be tilted to reflect the collimated light 122 in a desired direction. The tilting action of the at least one mirror is controlled by an electronic driver, which rapidly modulates the mirrors to project the second graphical image 60 onto the windshield 56.

In yet another exemplary embodiment, the optoelectrical mirror 120 is a galvanometer mirror. In an exemplary embodiment, the galvanometer mirror is an optoelectrical device which utilizes at least one mirror which rotates on an axis to redirect the collimated light 122. The at least one mirror of the galvanometer mirror is controlled by a galvanometer, which is an electric motor which converts electrical current signals into mechanical movement. The galvanometer rapidly rotates the at least one mirror on the axis, allowing the collimated light 122 to be redirected to scan the collimated light 122 across the windshield 56 and display the second graphical image 60. The light transmitted by the optoelectrical mirror 120 to the windshield 56 is referred to as a projected light 124.

It should be understood that in order to adjust a total light intensity of the projected light 124, the VGP 58 may include more or less than three light source modules without departing from the scope of the present disclosure.

Referring to FIG. 7, another exemplary embodiment of the VGP 58 includes the first light source module 92a, the second light source module 92b, the third light source module 92c, a first dichroic mirror 126a, a second dichroic mirror 126b, a third dichroic mirror 126c, and the output module 96. The description of the first light source module 92a, the second light source module 92b, the third light source module 92c, and the output module 96 given above in reference to FIG. 6 also applies to the corresponding elements in FIG. 7. Instead of the fiber-optic cables 98a, 98b, 98c, 98d and the fiber-optic coupler 94, the VGP 58 of the exemplary embodiment shown in FIG. 7 utilizes the first dichroic mirror 126a, the second dichroic mirror 126b, and the third dichroic mirror 126c to combine the narrow-beam light 110 from each of the first light source module 92a, the second light source module 92b, and the third light source module 92c.

In the scope of the present disclosure, a dichroic mirror is a mirror which reflects light of a predetermined wavelength and transmits light of other wavelengths. In an exemplary embodiment, the first dichroic mirror 126a, the second dichroic mirror 126b, and the third dichroic mirror 126c include a substrate material (e.g., glass, quartz) coated in a plurality of dielectric layers. Each of the plurality of dielectric layers is selected to have a particular index of refraction and thickness such that the first dichroic mirror 126a, the second dichroic mirror 126b, and the third dichroic mirror 126c reflect light of particular wavelengths and transmit light of other wavelengths.

In a non-limiting example, the first light source module 92a produces narrow-beam light 110 having a wavelength of 380 nanometers. The second light source module 92b produces narrow-beam light 110 having a wavelength of 405 nanometers. The third light source module 92c produces narrow-beam light 110 having a wavelength of 460 nanometers. Accordingly, the first dichroic mirror 126a is configured to reflect narrow-beam light 110 having a wavelength of 380 nanometers and transmit all other wavelengths of light. The second dichroic mirror 126b is configured to reflect narrow-beam light 110 having a wavelength of 405 nanometers and transmit all other wavelengths of light. The third dichroic mirror 126c is configured to reflect narrow-beam light 110 having a wavelength of 460 nanometers and transmit all other wavelengths of light. It should be understood that the aforementioned wavelengths are merely exemplary in nature.

The first dichroic mirror 126a is positioned such that narrow-beam light 110 from the first light source module 92a reflected by the first dichroic mirror 126a is incident upon the second dichroic mirror 126b. The second dichroic mirror 126b is positioned such that narrow-beam light 110 from the second light source module 92b reflected by the second dichroic mirror 126b is incident upon the third dichroic mirror 126c. The third dichroic mirror 126c is positioned such that narrow-beam light 110 from the third light source module 92c reflected by the third dichroic mirror 126c is incident upon the output module 96. In an exemplary embodiment, each of the first dichroic mirror 126a, the second dichroic mirror 126b, and the third dichroic mirror 126c are positioned at a 45-degree angle to an angle of incidence of the narrow-beam light 110 and aligned along a center axis, as depicted in FIG. 7.

Therefore, the narrow-beam light 110 with a wavelength of 380 nanometers from the first light source module 92a is reflected by the first dichroic mirror 126a and incident upon the second dichroic mirror 126b, as indicated by a first line 128a. The narrow-beam light 110 with a wavelength of 380 nanometers from the first light source module 92a is transmitted by the second dichroic mirror 126b and is incident upon the third dichroic mirror 126c, as indicated by a second line 128b. The narrow-beam light 110 with a wavelength of 405 nanometers from the second light source module 92b is reflected by the second dichroic mirror 126b and is incident upon the third dichroic mirror 126c, as indicated by the second line 128b. Therefore, both the narrow-beam light 110 with a wavelength of 380 nanometers from the first light source module 92a and the narrow-beam light 110 with a wavelength of 405 nanometers from the second light source module 92b are incident upon the third dichroic mirror 126c as indicated by the second line 128b. The narrow-beam light 110 with a wavelength of 380 nanometers from the first light source module 92a and the narrow-beam light 110 with a wavelength of 405 nanometers from the second light source module 92b are transmitted by the third dichroic mirror 126c and are incident upon the output module 96, as indicated by a third line 128c. The narrow-beam light 110 with a wavelength of 460 nanometers from the third light source module 92c is reflected by the third dichroic mirror 126c and is incident upon the output module 96, as indicated by the third line 128c. Therefore, the narrow-beam light 110 with a wavelength of 380 nanometers from the first light source module 92a, the narrow-beam light 110 with a wavelength of 405 nanometers from the second light source module 92b, and the narrow-beam light 110 with a wavelength of 460 nanometers from the third light source module 92c are incident upon the output module 96 as indicated by the third line 128c.

The total narrow-beam light (i.e., the narrow-beam light 110 with a wavelength of 380 nanometers from the first light source module 92a, the narrow-beam light 110 with a wavelength of 405 nanometers from the second light source module 92b, and the narrow-beam light 110 with a wavelength of 460 nanometers from the third light source module 92c) incident upon the output module 96 is collimated by the optical collimator 118 and directed by the optoelectrical mirror 120 as discussed above.

Referring again to FIG. 3, the vehicle controller 34 includes a VGP engine 130. The VGP engine 130 includes a programmable processor including programming to monitor various inputs and determine what information is appropriate to display. The VGP engine 130 can communication directly with various systems and components, or the VGP engine 130 can alternatively or additionally communicate over a LAN/CAN system. The VGP engine 130 utilizes information regarding the operational environment of the vehicle 10 derived from a number of inputs. The various sensing devices 40a-40n collect and provide information. The sensing devices 40a-40n include a camera or image capturing device taking periodic or sequential images representing a view from the vehicle 10. The windshield 56 is equipped with features capable of displaying an image projected thereupon while remaining transparent or substantially transparent such that occupants of the vehicle 10 can clearly observe outside of the vehicle 10 through the windshield 56.

The processor of the VGP engine 130 includes a non-transitory computer readable storage device or media. The processor may be a custom made or commercially available processor, a central processing unit (CPU), a graphics processing unit (GPU), an auxiliary processor among several processors associated with the VGP engine 130, a semiconductor-based microprocessor (in the form of a microchip or chip set), a macroprocessor, a combination thereof, or generally a device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the VGP engine 130 to control various systems of the vehicle 10. The VGP engine 130 may also consist of multiple controllers which are in electrical communication with each other. The VGP engine 130 may be inter-connected with additional systems and/or controllers of the vehicle 10, allowing the VGP engine 130 to access data such as, for example, speed, acceleration, braking, and steering angle of the vehicle 10.

The VGP engine 130 is in electrical communication, via the vehicle controller 34, with the plurality of sensing devices 40a-40n. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the VGP engine 130 are within the scope of the present disclosure.

The VGP 58, like the DLP 50, projects light to excite the light emitting material 90 (transparent phosphors) within the substrate 84 on the windshield 56 in a predetermined pattern to produce the second graphical image 60 on the windshield 56. In an exemplary embodiment, both the DLP 50 and the VGP 58 are disposed proximally to the headliner of the vehicle 10. In a non-limiting example, the 380 nanometer light of the projected light 124 excites red transparent phosphors. The 405 nanometer light of the projected light 124 excites blue transparent phosphors. The 460 nanometer light of the projected light 124 excites green transparent phosphors. It should be understood that in some embodiments, the transparent phosphors may be excited by other wavelengths of excitation light. Either the DLP 50 or the VGP 58 may be configured to produce any wavelengths of excitation light required to excite the transparent phosphors.

Figure 8:
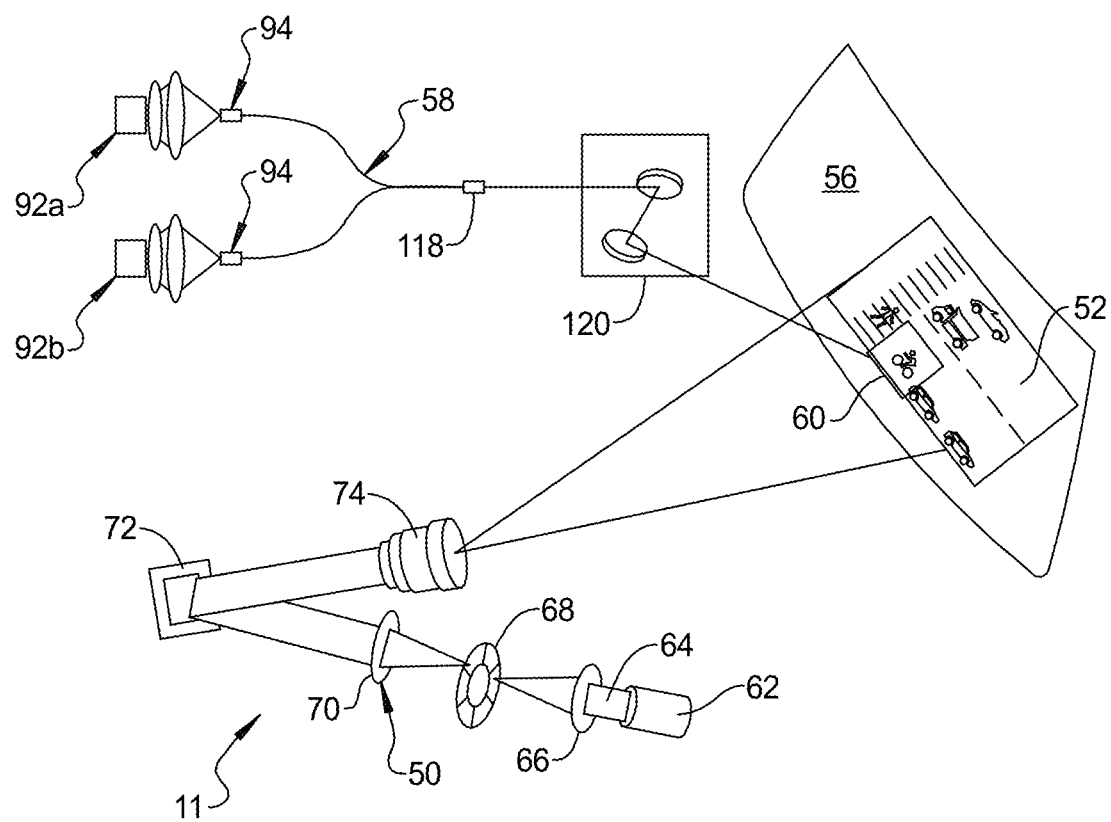
FIG. 8 is a schematic diagram of a system according to an exemplary embodiment, wherein a second graphical image from a vector graphic projector is displayed over a first graphical image from a digital light projector.

In an exemplary embodiment, the vehicle controller 34 uses the system 11 to display graphics indicating conditions of the vehicle 10 and/or the environment surrounding the vehicle 10 detected by the plurality of sensing devices 40a-40n. In an exemplary embodiment, the vehicle controller 34 uses the DLP 50 to display the first graphical image 52, which may include two-dimensional and three-dimensional depictions of the environment surrounding the vehicle 10, or images with vehicle information or infotainment content overlayed "on top" of the occupant's view of the environment outside the vehicle 10. The DLP is capable of providing the first graphical image across the entire windshield 56. Further, the vehicle controller 34 uses the VGP 58 to display the second graphical image 60, which may include rapid response alerts to critical safety conditions detected by the sensor system 28 of the vehicle 10. The VGP 58 is not capable of displaying three-dimensional graphic imagery, however, the VGP 58 is capable of providing instantaneous and brighter alerts by providing augmentation graphics, such as highlighting a pedestrian or a point of interest. Referring to FIG. 1, the second graphical image 60 may be displayed adjacent to the first graphical image 52, such as the arrow meant to draw the occupant's attention to the left. Alternatively, referring to FIG. 8, the second graphical image 60, may be overlayed onto the first graphical image 52, such as the highlighted box around the cyclist in FIG. 8.

Based upon the output of the occupant monitoring system 78 and input data tracking location information regarding the environment around the vehicle 10, the DLP engine 76 can accurately position the first graphical image 52 such that the occupant sees the first graphical image 52 overlaid with visual images through the windshield 56. Further, the VGP engine 130 can accurately position the second graphical image 60 relative to the first graphical image 52, such that the occupant sees the second graphical image 60 at the proper position in proximity to or overlaid upon the first graphical image 52.

Figure 9:
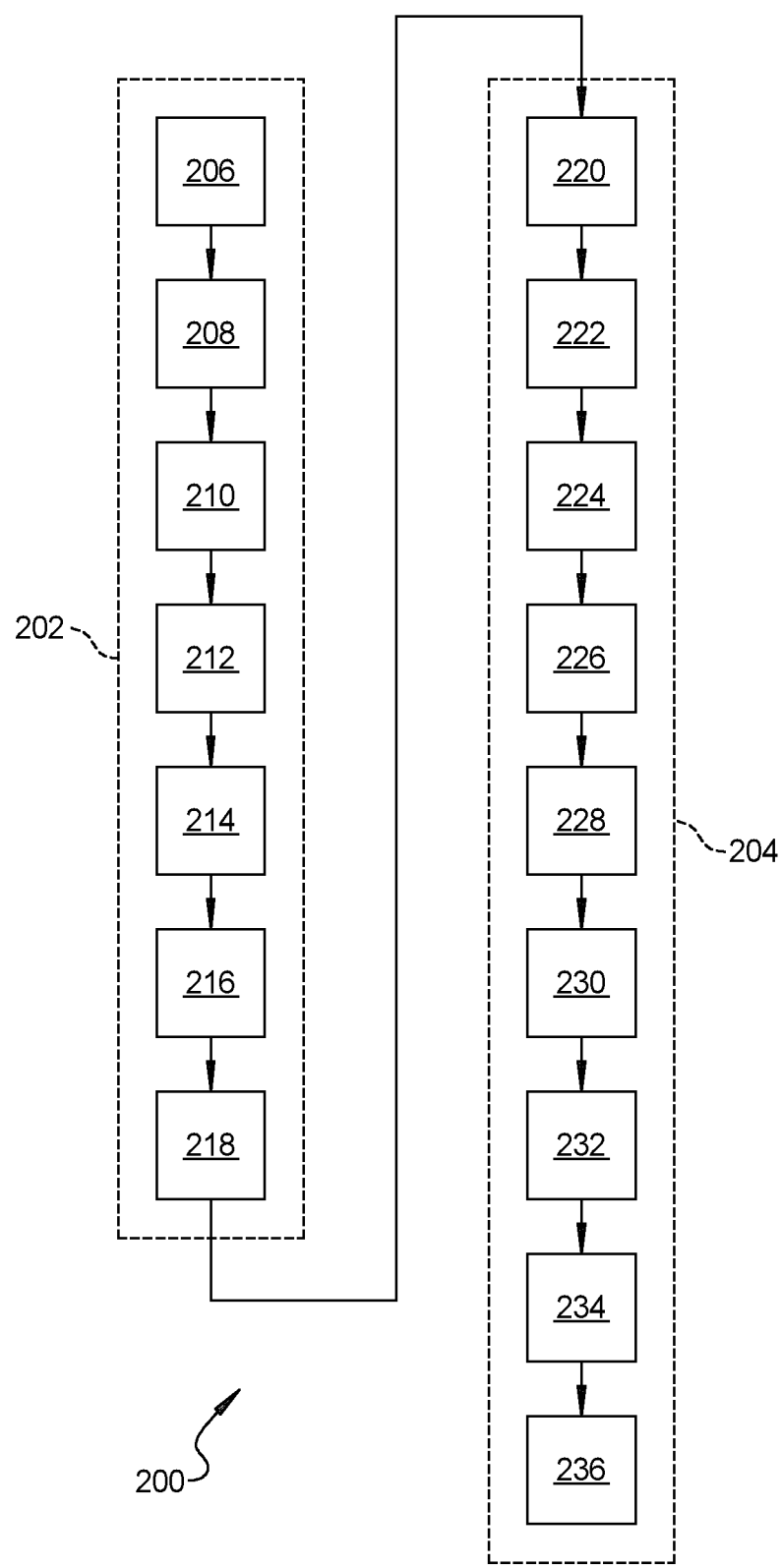
FIG. 9 is a flow chart illustrating a method according to an exemplary embodiment of the present disclosure.

Referring to FIG. 9, a method 200 of displaying graphics with a hybrid projector system 11 for a head up display within a vehicle, includes, beginning at block 202, projecting, with a digital light projector 50, a first graphical image 52 onto an inner surface 54 of a windshield 56 of the vehicle 10, and, moving to block 204, projecting, with a vector graphics projector 58, a second graphical image 60 onto the inner surface 54 of the windshield 56 of the vehicle 10.

In an exemplary embodiment, the projecting, with a digital light projector 50, a first graphical image 52 onto an inner surface 54 of a windshield 56 of the vehicle 10, at block 202, further includes, moving to block 206, projecting, with a light source 62, an excitation light 64, moving to block 208, focusing, with a condensing lens 66, the excitation light 64 from the light source 62, and moving to block 210, splitting, with a color filter 68, the focused excitation light 64 into red, green and blue light, and moving to block 212, focusing, with a shaping lens 70, the excitation light 64 passing through the color filter 68, and moving to block 214, re-directing, with a digital micro-mirror device (DMD) 72, the excitation light 64, and moving to block 216, receiving, with a projection lens 74, the excitation light 64 from the digital micro-mirror device 72 and, moving to block 218, projecting, with the projection lens 74, the excitation light 64 to the inner surface 54 of the windshield 56.

In an exemplary embodiment, the projecting, with a vector graphics projector 58, a second graphical image 60 onto the inner surface 54 of the windshield 56 of the vehicle 10, at block 204, further includes, moving to block 220, producing, with a light-emitting diode (LED) array 100 of a light source module 92a, a source light 106, and moving to block 222, receiving, with an optical bandpass filter 102 of the light source module 92a in optical communication with the LED array 100, the source light 106, and, moving to block 224, filtering, with the optical bandpass filter 102, the source light 106, and moving to block 226, transmitting, through the optical bandpass filter 102, filtered light 108 having a wavelength within a passband of the optical bandpass filter 102, and moving to block 228, receiving, with a focusing lens 104 of the light source module 92a in optical communication with the optical filter 102, the filtered light 108, and moving to block 230, transmitting, with the focusing lens 104, a narrow-beam light 110, and moving to block 232, receiving, with an optical collimator 118 in optical communication with the light source module 92a, the narrow-beam light 110, and moving to block 234, transmitting, with the optical collimator 118, a collimated light 122, and moving to block 236, directing, with an optoelectrical mirror 120 in optical communication with the optical collimator 118, the collimated light 122 to form a graphic.

In another exemplary embodiment, the projecting, with a vector graphics projector 58, a second graphical image 60 onto the inner surface 54 of the windshield 56 of the vehicle 10, at block 202, further includes projecting, with a plurality of light source modules 92a, 92b, 92c in optical communication with the optical collimator 118 of the vector graphics projector 58, a second graphical image 60 onto the inner surface 54 of the windshield 56 of the vehicle 10.

In another exemplary embodiment, the transmitting, with the focusing lens, a narrow-beam light at block 230 further incudes transmitting, with a fiber-optic cable waveguide 98a, 98b, 98c, 98d in optical communication with the plurality of light source modules 92a, 92b, 92c and the optical collimator 118, the narrow-beam light 110 from each of the plurality of light source modules 92a, 92b, 92c to the optical collimator 118.

In another exemplary embodiment, the transmitting, with the focusing lens 104, a narrow-beam light 110 at block 230 further incudes transmitting, with a plurality of dichroic mirrors 126a, 126b, 126c, wherein each of the plurality of dichroic mirrors 126a, 126b, 126c, is in optical communication with one of the plurality of light source modules 92a, 92b, 92c, the narrow-beam light 110 from each of the plurality of light source modules 92a, 92b, 92c, to the optical collimator 118, wherein each of the plurality of dichroic mirrors 126a, 126b, 126c, is configured to reflect a predetermined wavelength of the narrow-beam light 110 and transmit all other wavelengths of the narrow-beam light 110.

In another exemplary embodiment, the transmitting, with the focusing lens 104, a narrow-beam light 110 at block 230 further includes transmitting, with the focusing lens 104 of a first one of the plurality of light source modules 92a, a narrow-beam light 110 having a wavelength of 380 nanometers, transmitting, with the focusing lens 104 of a second one of the plurality of light source modules 92b, a narrow-beam light 110 having a wavelength of 405 nanometers, and transmitting, with the focusing lens 104 of a third one of the plurality of light source modules 92c, a narrow-beam light 110 having a wavelength of 460 nanometers.

The system 11 of the present disclosure offer several advantages. By providing a VGP 58 with a plurality of light source modules 92a, 92b, 92c, each of the plurality of light source modules 92a, 92b, 92c may be individually configured to achieve a desired output characteristics (e.g., intensity, wavelength, and the like). Furthermore, each of the plurality of light source modules 92a, 92b, 92c may be adjusted by the VGP engine 130 to adjust an intensity and wavelength composition of the projected light 124 during projection, enabling precise control of the excitation of the transparent phosphors. Furthermore, excitation of the transparent phosphors is achieved using diffuse light sources (i.e., the LED array), reducing cost and complexity and avoiding possible disadvantages of high-powered, concentrated light sources, such as the light source 62 of the DLP 50. By using a DLP 50 in conjunction with a VGP 58, the system 11 provides the capability of displaying high intensity two-dimensional and three-dimensional graphic images with the DLP 50 and the capability of displaying instantaneous safety critical augmentation graphics with the VGP 58.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A hybrid projector system for a head up display within a vehicle, comprising:
    a digital light projector adapted to project a first graphical image onto an inner surface of a windshield of the vehicle, the digital light projector including:
        a light source adapted to project an excitation light;
        a condensing lens adapted to focus the excitation light from the light source;
        a color filter adapted to split the focused excitation light into red, green and blue light;
        a shaping lens adapted to focus the excitation light passing through the color filter:
        a digital micro-mirror device (DMD) adapted to re-direct the excitation light; and
        a projection lens adapted to receive the excitation light from the digital micro-mirror device and project the excitation light to the inner surface of the windshield; and
    a vector graphics projector adapted to project a second graphical image onto the inner surface of the windshield of the vehicle within the first graphical image, the second graphical image having greater brightness than the first graphical image and adapted to highlight a feature within the first graphical image.

2. The system of claim 1, wherein the vector graphics projector includes:
    a light source module including:
        a light-emitting diode (LED) array configured to produce a source light;
        an optical filter in optical communication with the LED array, wherein the optical filter is configured to receive the source light and transmit a filtered light; and
        a focusing lens in optical communication with the optical filter, wherein the focusing lens is configured to receive the filtered light and transmit a narrow-beam light;
    an optical collimator in optical communication with the light source module, wherein the optical collimator is configured to receive the narrow-beam light and transmit a collimated light; and
    an optoelectrical mirror in optical communication with the optical collimator, wherein the optoelectrical mirror is configured to direct the collimated light to form a graphic.

3. The system of claim 2, wherein the optical filter is an optical bandpass filter configured to filter the source light and transmit the filtered light, wherein the filtered light includes only light having a wavelength within a passband of the optical bandpass filter.

4. The system of claim 3, further comprising a plurality of light source modules in optical communication with the optical collimator.

5. The system of claim 4, further comprising an optical waveguide in optical communication with the plurality of light source modules and the optical collimator, wherein the optical waveguide is configured to transmit the narrow-beam light from each of the plurality of light source modules to the optical collimator.

6. The system of claim 5, wherein the optical waveguide is a fiber-optic cable in optical communication with the focusing lens of each of the plurality of light source modules using a fiber-optic coupler.

7. The system of claim 4, further including a plurality of dichroic mirrors, wherein each of the plurality of dichroic mirrors is in optical communication with one of the plurality of light source modules, and wherein each of the plurality of dichroic mirrors is configured to transmit the narrow-beam light from one of the plurality of light source modules to the optical collimator.

8. The system of claim 7, wherein each of the plurality of dichroic mirrors is configured to reflect a predetermined wavelength of the narrow-beam light and transmit all other wavelengths of the narrow-beam light.

9. The system of claim 4, wherein a first one of the plurality of light source modules is configured to produce narrow-beam light having a wavelength of 380 nanometers, wherein a second one of the plurality of light source modules is configured to produce narrow-beam light having a wavelength of 405 nanometers, and wherein a third one of the plurality of light source modules is configured to produce narrow-beam light having a wavelength of 460 nanometers.

10. The system of claim 4, wherein the optoelectrical mirror is a digital micro-mirror device (DMD).

11. The system of claim 4, wherein the optoelectrical mirror is at least one of: a microelectromechanical scanning mirror and a galvanometer mirror.

12. The system of claim 1, further including:
    a substrate positioned on the windshield; and
    light emitting material embedded within the substrate;
    wherein, when the light emitting material is exposed to excitation light from the light source of the digital light projector, the light emitting material emits visible light.

13. A method of displaying graphics with a hybrid projector system for a head up display within a vehicle, comprising:
    projecting, with a digital light projector, a first graphical image onto an inner surface of a windshield of the vehicle, including:
        projecting, with a light source, an excitation light;
        focusing, with a condensing lens, the excitation light from the light source:
        splitting, with a color filter, the focused excitation light into red, green and blue light:
        focusing, with a shaping lens, the excitation light passing through the color filter:
        re-directing, with a digital micro-mirror device (DMD), the excitation light; and
        receiving, with a projection lens, the excitation light from the digital micro-mirror device and projecting, with the projection lens, the excitation light to the inner surface of the windshield; and
    projecting, with a vector graphics projector, a second graphical image onto the inner surface of the windshield of the vehicle within the first graphical image, the second graphical image having greater brightness than the first graphical image and adapted to highlight a feature within the first graphical image.

14. The method of claim 13, wherein the projecting, with a vector graphics projector, a second graphical image onto the inner surface of the windshield of the vehicle further includes:

producing, with a light-emitting diode (LED) array of a light source module, a source light;

receiving, with an optical bandpass filter of the light source module in optical communication with the LED array, the source light, and filtering, with the optical bandpass filter, the source light, and transmitting, through the optical bandpass filter, filtered light having a wavelength within a passband of the optical bandpass filter;

receiving, with a focusing lens of the light source module in optical communication with the optical filter, the filtered light, and transmitting, with the focusing lens, a narrow-beam light;

receiving, with an optical collimator in optical communication with the light source module, the narrow-beam light, and transmitting, with the optical collimator, a collimated light; and directing, with an optoelectrical mirror in optical communication with the optical collimator, the collimated light to form a graphic.

15. The method of claim 14, wherein the projecting, with a vector graphics projector, a second graphical image onto the inner surface of the windshield of the vehicle further includes projecting, with a plurality of light source modules in optical communication with the optical collimator of the vector graphics projector, a second graphical image onto the inner surface of the windshield of the vehicle.

16. The method of claim 15, wherein the transmitting, with the focusing lens, a narrow-beam light further incudes transmitting, with a fiber-optic cable waveguide in optical communication with the plurality of light source modules and the optical collimator, the narrow-beam light from each of the plurality of light source modules to the optical collimator.

17. The method of claim 15, wherein the transmitting, with the focusing lens, a narrow-beam light further incudes transmitting, with a plurality of dichroic mirrors, wherein each of the plurality of dichroic mirrors is in optical communication with one of the plurality of light source modules, the narrow-beam light from each of the plurality of light source modules to the optical collimator, wherein each of the plurality of dichroic mirrors is configured to reflect a predetermined wavelength of the narrow-beam light and transmit all other wavelengths of the narrow-beam light.

18. The method of claim 15, wherein the transmitting, with the focusing lens, a narrow-beam light further includes:
transmitting, with the focusing lens of a first one of the plurality of light source modules, a narrow-beam light having a wavelength of 380 nanometers;
transmitting, with the focusing lens of a second one of the plurality of light source modules, a narrow-beam light having a wavelength of 405 nanometers; and
transmitting, with the focusing lens of a third one of the plurality of light source modules, a narrow-beam light having a wavelength of 460 nanometers.

19. The method of claim 13, wherein the projecting, with the projection lens, the excitation light to the inner surface of the windshield further includes:
projecting, with the projection lens, the excitation light to a substrate positioned on the inner surface of the windshield; and
emitting, with light emitting material embedded within the substrate, visible light in response to expose of the light emitting material to the excitation light.

20. A vehicle having a hybrid projector system for a head up display, comprising:
a digital light projector adapted to project a first graphical image onto an inner surface of a windshield of the vehicle, the digital light projector including:
a light source adapted to project an excitation light;
a condensing lens adapted to focus the excitation light from the light source;
a color filter adapted to split the focused excitation light into red, green and blue light;
a shaping lens adapted to focus the excitation light passing through the color filter;
a digital micro-mirror device (DMD) adapted to redirect the excitation light; and
a projection lens adapted to receive the excitation light from the digital micro-mirror device and project the excitation light to the inner surface of the windshield; and
a vector graphics projector adapted to project a second graphical image onto the inner surface of the windshield of the vehicle within the first graphical image, the second graphical image having greater brightness than the first graphical image and adapted to highlight a feature within the first graphical image, the vector graphics projector including:
a plurality of light source modules, each of the plurality of light source modules including:
a light-emitting diode (LED) array configured to produce a source light;
an optical bandpass filter in optical communication with the LED array, wherein the optical bandpass filter is configured to receive the source light and transmit a filtered light having a wavelength within a passband of the optical bandpass filter; and
a focusing lens in optical communication with the optical bandpass filter, wherein the focusing lens is configured to receive the filtered light and transmit a narrow-beam light, wherein a first one of the plurality of light source modules is configured to produce narrow-beam light having a wavelength of 380 nanometers, a second one of the plurality of light source modules is configured to produce narrow-beam light having a wavelength of 405 nanometers, and a third one of the plurality of light source modules is configured to produce narrow-beam light having a wavelength of 460 nanometers;
an optical collimator in optical communication with the light source module, wherein the optical collimator is configured to receive the narrow-beam light and transmit a collimated light; and
a digital micro-mirror device in optical communication with the optical collimator, wherein the digital micro-mirror device is configured to direct the collimated light to form a graphic.

* * * * *